Dec. 3, 1957 R. MILLER 2,815,010
DIRECT REVERSING ENGINE, AND METHOD OF OPERATING IT
Filed March 1, 1955 4 Sheets-Sheet 2

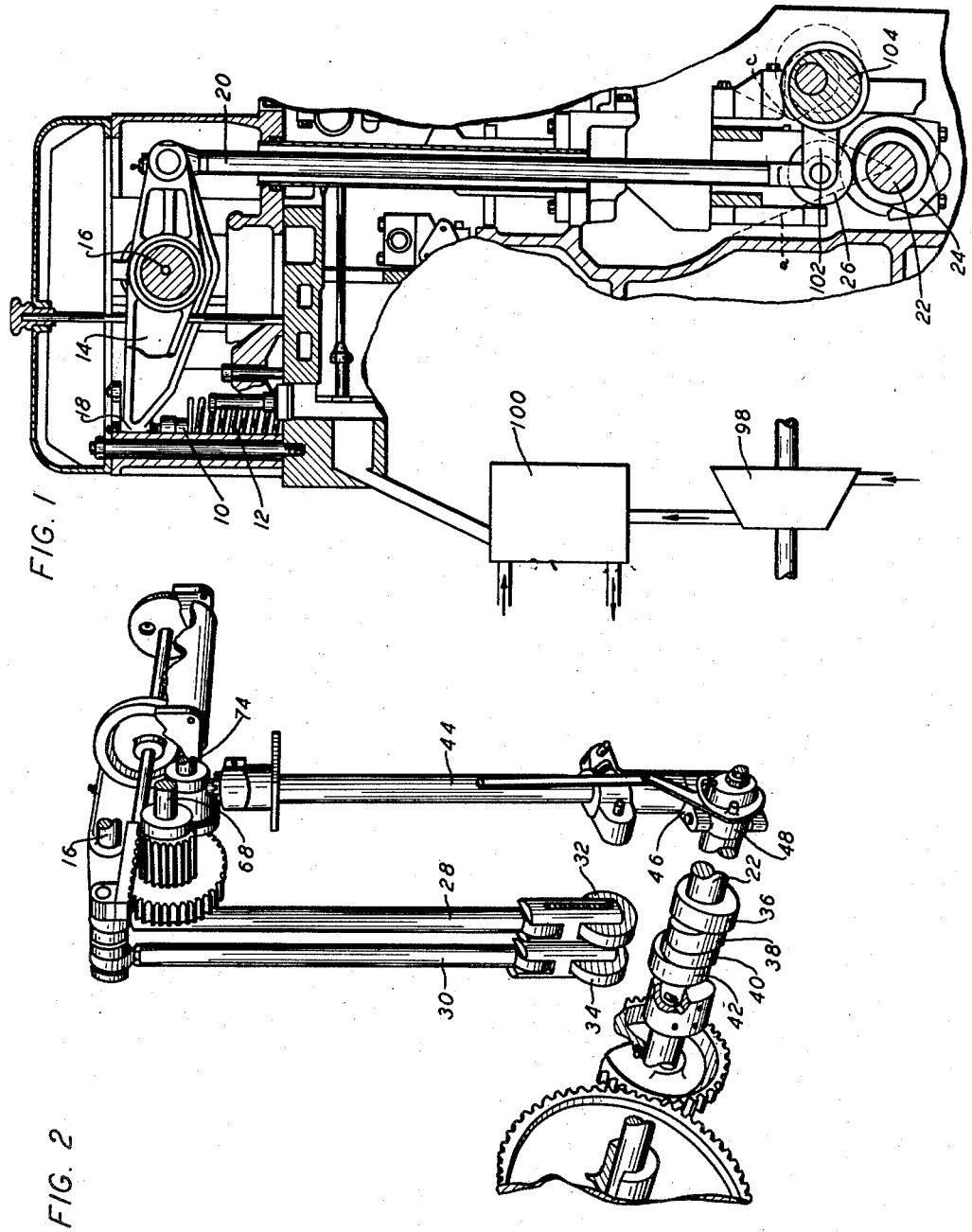

INVENTOR
RALPH MILLER
BY
PARKER & CARTER
ATTORNEYS

Dec. 3, 1957 R. MILLER 2,815,010
DIRECT REVERSING ENGINE, AND METHOD OF OPERATING IT
Filed March 1, 1955 4 Sheets-Sheet 3

INVENTOR
RALPH MILLER
BY
PARKER & CARTER
ATTORNEYS

Dec. 3, 1957 R. MILLER 2,815,010
DIRECT REVERSING ENGINE, AND METHOD OF OPERATING IT
Filed March 1, 1955 4 Sheets-Sheet 4

INVENTOR.
RALPH MILLER
BY
PARKER & CARTER
ATTORNEYS

United States Patent Office 2,815,010
Patented Dec. 3, 1957

2,815,010

DIRECT REVERSING ENGINE, AND METHOD OF OPERATING IT

Ralph Miller, Milwaukee, Wis.

Application March 1, 1955, Serial No. 491,458

5 Claims. (Cl. 123—41)

This invention is in the field of internal combustion engines of the diesel or compression ignition type although it is equally applicable to gas engines, dual fuel engines, spark ignition engines, or other well-known types.

A primary object of my invention is a method of operating a locomotive or marine engine, or the like.

Another object of my invention is a method of operating such an engine both ahead and astern.

Another object of my invention is a method of operating the above type of engine with variable or changeable valve timing so as to reduce the amount of valve gear required.

Another object of my invention is a method of operating an engine of the above type so that the engine can be operated either ahead or astern, in either direction, with the valves being opened and closed by the same valve gear.

Another object of my invention is a method of operating a marine or locomotive engine, or the like, so as to entrap less than the full volumetric capacity in the cylinders while the engine is running both ahead and astern.

Other objects will appear from time to time in the ensuing specification and drawings in which:

Figure 1 is a side section of a part of an engine showing the valve actuating mechanism, such as the push rods, rockers and the like, and the inlet air conditioning mechanism diagrammatically;

Figure 2 is a perspective view, with parts omitted for clarity, showing the reversing mechanism;

Figures 3, 4:
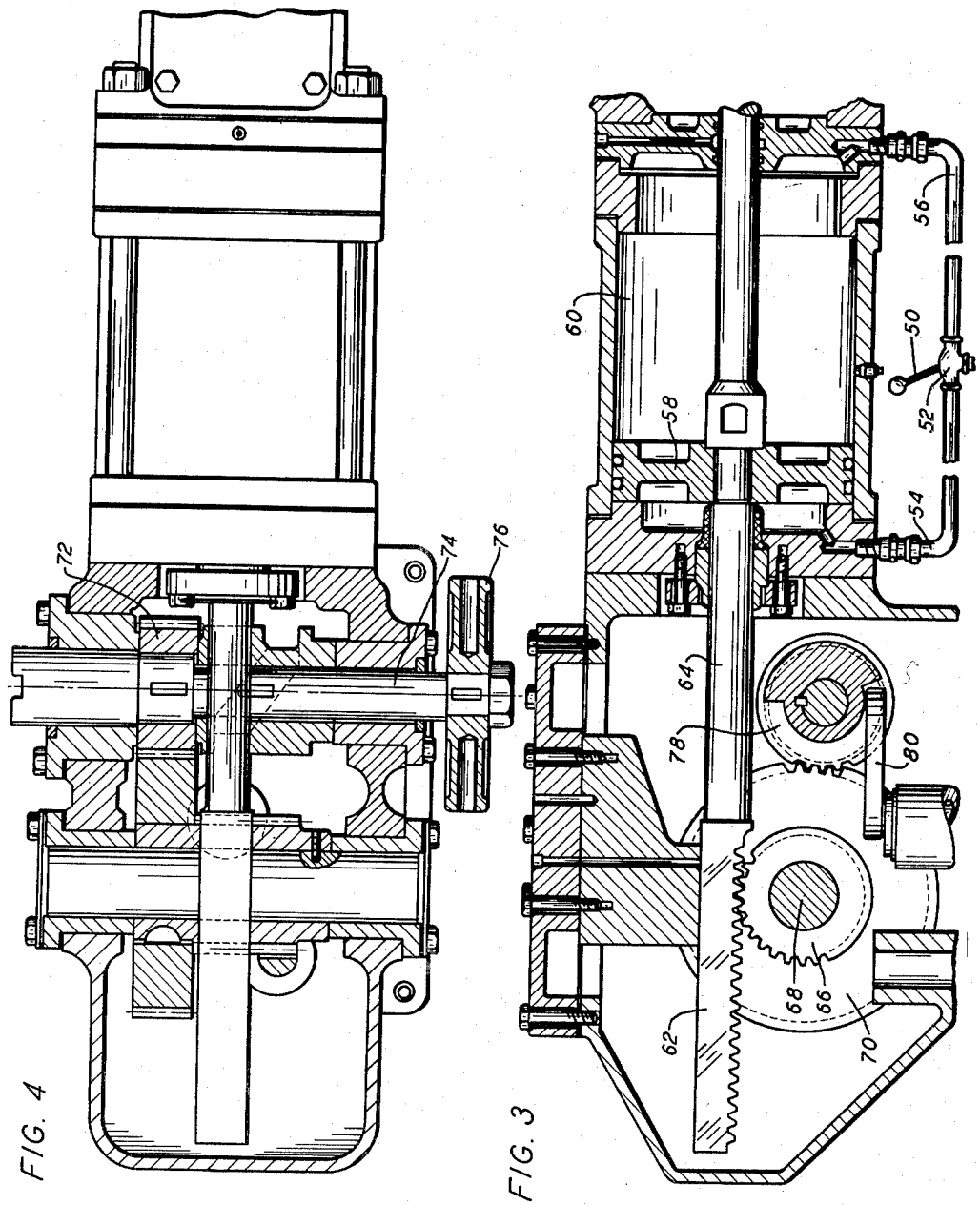
Figure 3 is a section of the actuating mechanism for the reversing gear.
Figure 4 is a top view, partly in section, of Figure 3.

In Figure 1, part of an engine is shown and includes the usual cylinder and piston, not shown. Valves in the cylinder head control the admission of air, as well as the exhaust of burnt gases. The valves each have stems 10 closed by the usual coil springs 12 surrounding the valve stem. A rocker arm 14, pivoted on a shaft 16, is connected to the top of the valve stem at 18 and is actuated by a push rod 20 in the usual manner. The conventional camshaft 22 has a cam lobe or cam portion 24 which actuates a roller or follower 26 on the end of the push rod to open and close the valve.

To reverse an engine, all the inlet and exhaust valve followers, such as 24, must first be lifted from the camshaft so that it can be freely shifted laterally to place different cams under the follower rollers. For example, in Figure 2, for each follower, the camshaft carries two cams. The push rod 28 might control an inlet valve, while the push rod 30 controls an exhaust valve, the push rod having followers 32 and 34 respectively. The camshaft 22 has two inlet cams 36 and 38 for the inlet roller 32 and two exhaust cams 40 and 32 for the exhaust roller 34.

The camshaft is shifted laterally by a pivot shaft 44 which has a fork or strap 46 connected to a collar 48 around the camshaft.

Figure 5:
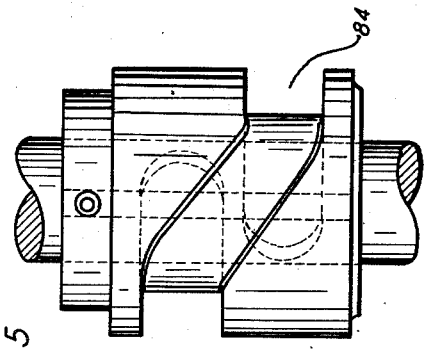
Figure 5 is a bottom view of the shift cam.
Figure 6:
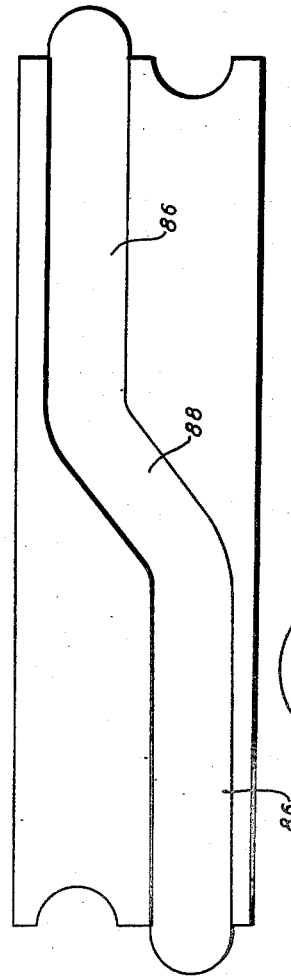
Figure 6 is a layout of the shift cam profile.

The operator controls a manual lever 50, or the like, shown schemactially in Figure 3, which operates a 3-way valve 52 to admit high pressure air or fluid, or any suitable medium, through lines 54 and 56 to opposite sides of a suitable piston 58 carried in a cylinder 60. The high pressure fluid or air will shift the piston in either direction, dependent upon the position of the lever 50, the movement of the piston shifting an actuator rack 62 on the end of the piston rod 64. The rack meshes with a pinion 66 carried on a suitable shaft 68 which also carries a gear or pinion 70 which meshes with a gear 72 mounted on a shaft 74. The shaft 74 carries a suitable control wheel 76 and a reversing or shift cam 78, shown in detail in Figure 5 with a layout in Figure 6.

Figure 7:
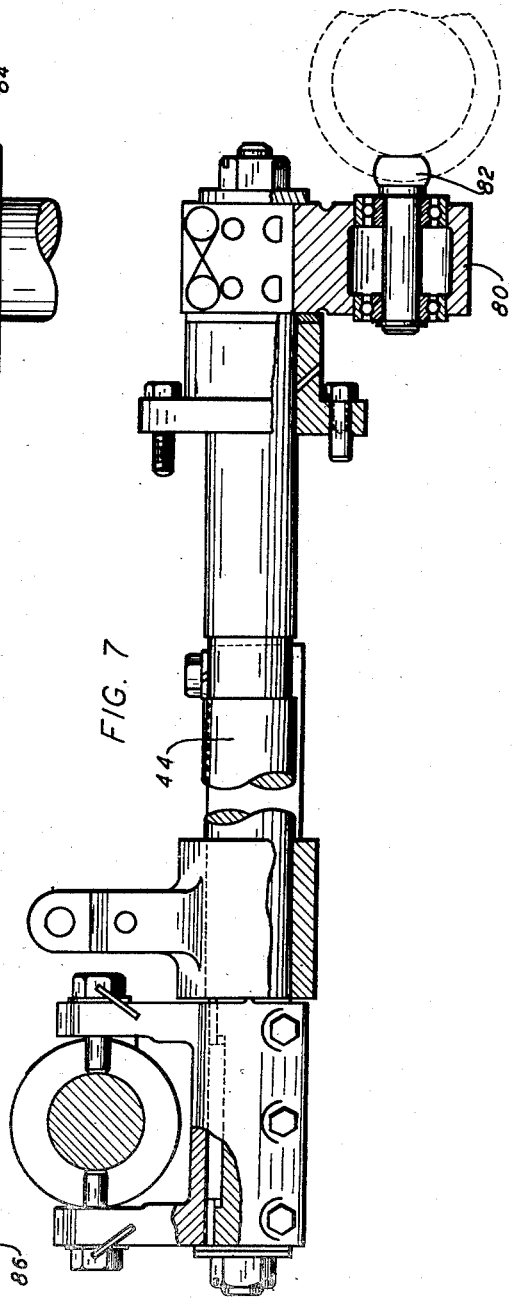
Figure 7 is a side view of the mechanism for shifting the cam shaft.

The upper end of the pivot shaft 44 carries a lever 80, shown schematically in Figure 3 and in detail in Figure 7, with a pivotally mounted follower 82 controlled by the shift cam.

The shift cam has a face type groove 84 with three main portions, a non-effective slot or portion 86 at each end and a shift portion or segment 88 between them. Thus the follower will be unaffected and the pivot shaft 44 will not pivot when the follower rides in the straight portions 86 of the cam groove. This can be termed a delay period at each end of the cam, while the diagonal or effective portion 88 of the groove will pivot the shaft a predetermined amount.

Figure 10:
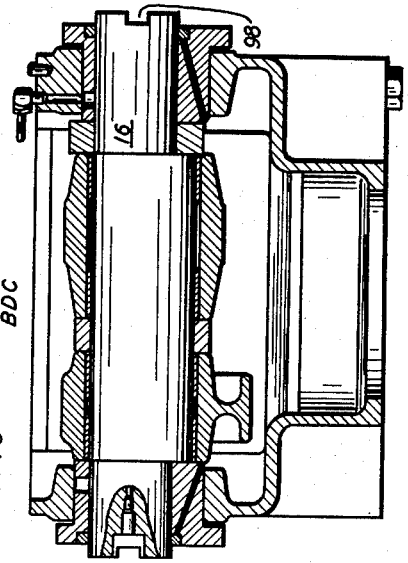
Figure 10 is a section taken along line 10—10 of Figure 9.
Figure 8:
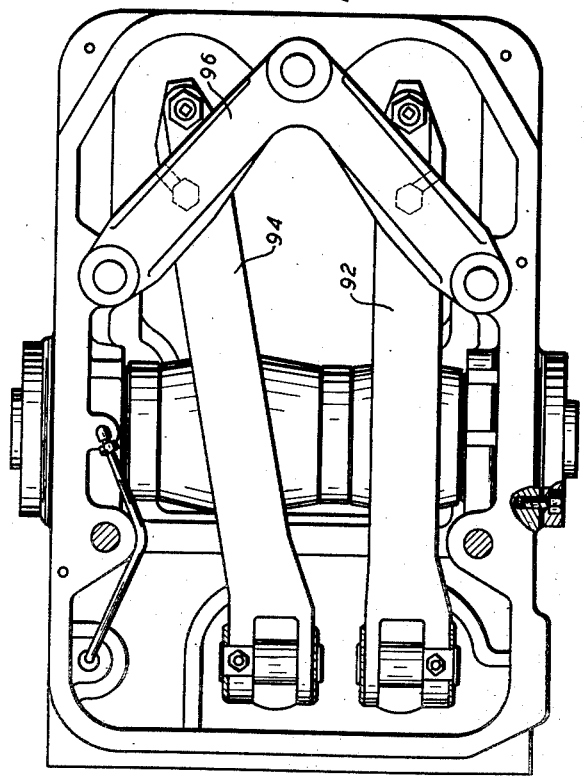
Figure 8 is a top view of the valve actuating mechanism.
Figure 9:
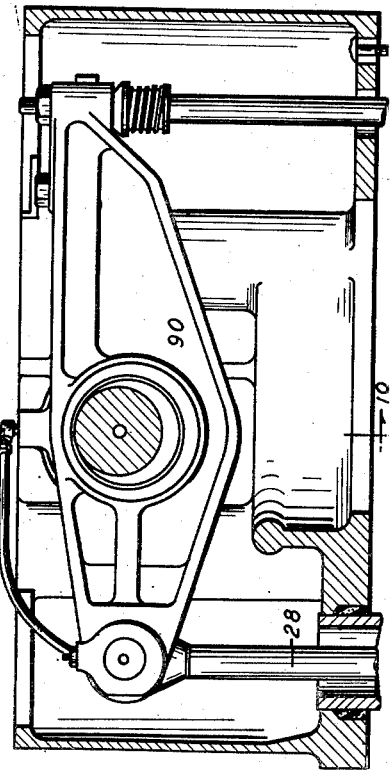
Figure 9 is a side view, partly in section, of Figures 8.

The shaft for the rocker arms has an eccentric portion 90, as shown in Figures 1, 9 and 10, to lift the follower rollers 32 and 34 away from the camshaft.

The eccentric portion or eccentric shaft 90 carries the rocker arms 92 and 94 for the inlet and exhaust valves respectively, the rocker arms being straddled by a suitable yoke 96 or the like. The shaft 16 may be suitably slotted as at 98 in Figure 10, or keyed to interlock with the reversing camshaft 74, or the actuating shaft 68. Either of these two latter shafts could be directly keyed or locked to the valve reverse shaft, or they could be suitably geared to it. In Figure 2, these shafts have been shown off-set slightly for clarity. However, they could be aligned.

When the engine is to be reversed, the manual lever 50 is shifted from one side to the other to reverse the fluid to the piston 58. This rotates the cam 78 through the rack 62, gears 66, 70 and 72. The pivot shaft remains stationary during the first portion of the cam's rotative movement as the pivot shaft follower 82 rides in the straight portion 86 of the cam. During this first portion of movement, the eccentric 90 lifts or pivots the rocker arms 92 and 94 about the valves to raise the push rod follower, as shown schematically in Figure 2.

When the follower passes through the diagonal portion 88 of the cam, the pivot shaft will shift the camshaft to align the other set of cams with the followers for the exhaust and inlet push rods.

When the engine is again to be reversed, the sequence or cycle of operation will be exactly the reverse.

When the engine is operating in either direction, it is desired that less than full volumetric capacity of the cylinders be entrapped for compression by closing the valve or valves early or before bottom dead center during the suction or intake stroke of the piston or late after bottom dead center during the compression stroke of the piston.

Figure 11:
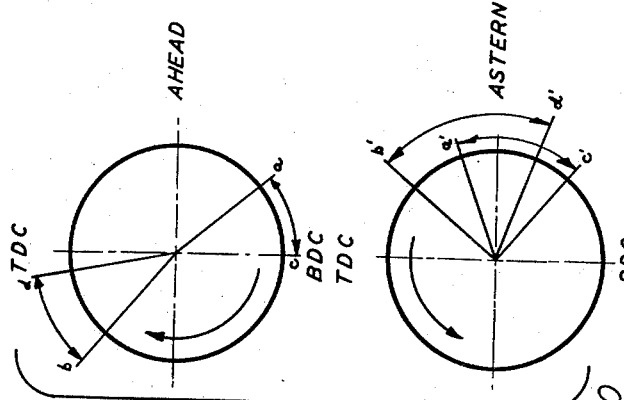
Figure 11 is a valve timing diagram of the engine running both ahead and astern.

For example in Figure 11, I have shown two valve timing diagrams indicating the operation of the valves for both ahead and astern. During the suction stroke of the piston at full load, the inlet valve or valves are closed at *a* a predetermined number of degrees ahead of bottom dead center. During the exhaust stroke, the inlet valves are open at *b* at full load. It should be noted that by closing the inlet valve at *a*, less than the full volumetric capacity of the cylinders is entrapped for compression and the temperature rise, due to compression alone, will be reduced.

At no loads and at light loads, I close the inlet valve at *c*, so that the temperature of the air at the end of compression will be high enough to ignite the fuel. Air is supplied to the cylinders through a suitable supercharger 98 shown schematically in Figure 1, driven by the exhaust gases or the like and through an intercooler 100 to remove the heat of compression. It should be understood that the supercharger and the intercooler can be of any suitable type and I have shown them only diagrammatically in Figure 1.

To shift the time of closing of the inlet valve from the position *a* at full load in Figure 11 while going ahead to the position *c* at no load or light loads, the follower 26 is carried by a strap 102 which is controlled by an eccentric 104. The eccentric is controlled by any suitable mechanism tied to the load or a load factor, such as the mechanism shown in my prior Patent No. 2,670,595, which controls the time of closing of the inlet valve in relation to the inlet manifold pressure. The eccentric 104 shifts the follower 26 back and forth between the positions *a* and *c* indicated in Figure 1. Thus the time of closing will be varied in accordance with the valve timing diagram in Figure 11.

When the time of closing of the inlet valve is shifted from the position *a* to the position *c*, the time of opening will also be retarded from the position *b* to the position *d*, which reduces the valve overlap and the amount of scavenging at the light loads.

When the engine is running astern, or in the other direction, the inlet valve is held open past bottom dead center, as shown in the bottom half of Figure 11, and is closed at *a'* when the engine is at full load or the heavy loads.

The astern cam will open the inlet valve at the position *b'* after more than 360 degrees of camshaft rotation.

For the light loads, the inlet valve will be closed at the position *c'* so as to entrap more air than at the full load position *a'*. Again, the inlet valve will be opened at *d'* after more than 360 degrees of crankshaft travel.

It should be noted that the inlet valve is closed while the engine is operating either ahead or astern in relation to the load. While the engine is running ahead, the inlet valve closes at position *c* when no load is on the engine and is shifted to the position *a*, or is advanced, when the heavier loads or full load is carried by the engine. When the engine is running astern, the inlet valve closes at position *c'* and when load is placed on the engine, the time of closing is shifted to position *a'*.

Thus the inlet valve is closed during the suction stroke at full load while the engine is running ahead and is held open past bottom dead center and closed during the compression stroke while the engine is running astern. In effect, the ahead and astern cams close the inlet valve on the same side of the valve timing diagrams in Figure 11, regardless of whether the engine is running ahead or astern, even though this involves closing the inlet valve during the suction stroke while running ahead and during the compression stroke while running astern.

However, it should be noted that by this arrangement or method of operation, the same valve gear, including the push rods and followers, as well as the change mechanism with the strap 102 and eccentric 104, can be used to vary the time of closing of the inlet valve between no load and full load regardless of whether the engine is running ahead or astern. A double set of valve actuating mechanism or gears is not required.

While I have shown and described the preferred form of my invention, it should be understood that numerous changes can be made. For example, I have stated that the inlet valve is closed on the suction stroke while the engine is running ahead and on the compression stroke while the engine is running astern. This could be reversed so that the inlet valve would close during the compression stroke while running ahead and during the suction stroke while running astern; the reverse relationship. With this reversal, however, it should be noted that the same advantage is gained, namely only one set of valve gear is required for each valve.

Even though I have shown a 4-cycle engine, it should be understood that the invention can be applied to a 2-cycle engine of the type shown in my co-pending application Serial No. 398,579, filed December 16, 1953, or my co-pending application Serial No. 242,372, filed August 17, 1951, by controlling the valves, shown in these applications, in the cylinder heads. It should also be understood that even though I have shown the valve timing in inverse relation to the load, meaning that as the load is decreased the time of closing of the inlet valve is advanced and vice versa, nevertheless the reverse situation could take place and the invention would have equal adaptability.

I therefore wish that my showing be taken as in a large sense illustrative or diagrammatic rather than as limiting me to my precise showing.

I claim:

1. In a reversing internal combustion engine, a cylinder and piston mounted for reciprocation therein, a valve-and-port mechanism for controlling the admission of inlet air and the exhaustion of burnt gases, and a valve actuating mechanism including means for closing the valve-and-port mechanism when the piston is a substantial distance on one side of bottom dead center to entrap inlet air for compression while the engine is running in one direction of rotation, and means for closing the valve-and-port mechanism when the piston is a substantial distance on the other side of bottom dead center to entrap inlet air for compression while the engine is running in the other direction of rotation, the valve actuating mechanism being constructed and arranged to close the valve-and-port mechanism ahead of the piston's bottom dead center position while the engine is turning in an ahead direction of rotation and adapted to close the valve-and-port mechanism behind the piston's bottom dead center position while the engine is turning in an astern direction of rotation.

2. In a reversing internal combustion engine, a cylinder and piston, a supercharger for precompressing the inlet air so as to raise its temperature and pressure, an intercooler for withdrawing at least a part of the heat of precompression from the inlet air before it is supplied to the cylinder, a valve for the cylinder, and an actuating mechanism for the valve adapted to actuate the valve in timed relationship to the cyclical operation of the engine to entrap inlet air for compression, including a device for actuating the valve so as to entrap substantially less than the full volumetric capacity of the cylinder when the engine is turning either in an ahead or an astern direction of rotation, and said device including means for closing the valve in an advanced position ahead of bottom dead center or a retarded position after bottom dead center when the engine is turning in one direction or the other, respectively, so as to entrap substantially less than the full volumetric capacity of the cylinder regardless of the engine's direction of rotation.

3. In a reversing internal combustion engine, a cylinder and piston, a valve for the cylinder and an actuating mechanism for the valve adapted to close the valve in timed relationship to the cyclical operation of the engine to entrap inlet air for compression, including a device for closing the valve to entrap substantially less air than the full volumetric capacity of the cylinder when the engine is turning either ahead or astern, said device including means for closing the valve in an advanced position ahead of bottom dead center when the engine is turning in one direction, and in a retarded position after bottom dead center when the engine is turning in the other direction, so as to entrap substantially less than the full volumetric capacity of the cylinder regardless of the engine's direction of rotation.

4. The structure of claim 3 further characterized by and including a supercharger for preliminarily compressing the inlet air so as to raise its temperature and pressure, and an intercooler for withdrawing at least a part of the heat of compression from the inlet air before it is supplied to the cylinder.

5. The structure of claim 3 in which said last mentioned means is constructed and arranged to close the valve in an advanced position when the engine is turning in an ahead direction of rotation and in a retarded position when the engine is turning in an astern direction of rotation.

References Cited in the file of this patent

UNITED STATES PATENTS

| | | |
|---|---|---|
| 1,741,729 | Newton | Dec. 31, 1929 |
| 2,243,883 | Ramstad | June 3, 1941 |
| 2,292,233 | Lysholm | Aug. 4, 1942 |
| 2,670,595 | Miller | Mar. 2, 1954 |